United States Patent

Pinker et al.

[11] Patent Number: 5,808,410
[45] Date of Patent: *Sep. 15, 1998

[54] FLAT PANEL LIGHT SOURCE FOR LIQUID CRYSTAL DISPLAYS

[75] Inventors: Ronald D. Pinker, Peekskill; Peter J. Janssen, Scarborough; Babar A. Khan, Ossining; David A. Cammack, Scarborough, all of N.Y.

[73] Assignee: Philips Electronics North America Corporation, NY, N.Y.

[ * ] Notice: The term of this patent shall not extend beyond the expiration date of Pat. No. 5,574,327.

[21] Appl. No.: 485,894

[22] Filed: Jun. 7, 1995

Related U.S. Application Data

[63] Continuation-in-part of Ser. No. 177,089, Dec. 30, 1993, Pat. No. 5,438,343, which is a continuation-in-part of Ser. No. 922,707, Jul. 28, 1992, abandoned.

[51] Int. Cl.⁶ .............................. H01J 1/62; H01J 63/04; H01J 5/16; H01J 61/40
[52] U.S. Cl. .......................... 313/493; 313/110; 313/634; 313/573
[58] Field of Search ...................... 313/110, 484, 313/490–493, 532, 573, 610, 616, 634; 445/25, 44; 156/67, 663; 359/48–50; 362/800

[56] References Cited

U.S. PATENT DOCUMENTS

| | | |
|---|---|---|
| 5,401,966 | 3/1995 | Gray et al. . |
| 5,438,343 | 8/1995 | Khan et al. .............................. 313/493 |
| 5,440,324 | 8/1995 | Strickling, III ........................ 359/50 X |
| 5,574,327 | 11/1996 | Cammack et al. ................... 313/634 X |

*Primary Examiner*—Sandra L. O'Shea
*Assistant Examiner*—Mack Haynes
*Attorney, Agent, or Firm*—Arthur G. Schaier

[57] ABSTRACT

A liquid crystal display is provided using a flat panel of microlamps being formed from gas discharge display structures and made by the method of making the same utilizing integrated circuit fabrication techniques. The flat panel of microlamps is formed into an array for providing light to individual pixels, or a small number of pixels, in a liquid crystal display. Such microlamp lighting can increase the illumination of LCDs.

5 Claims, 9 Drawing Sheets

FLAT PANEL LIGHT SOURCE FOR LIQUID CRYSTAL DISPLAYS

CROSS-REFERENCE TO RELATED APPLICATION

This application is a continuation-in-part of application Ser. No. 08/177,089, filed Dec. 30, 1993 and now U.S. Pat. No. 5,438,343, which is a continuation-in-part of application Ser. No. 922,707 filed Jul. 28, 1992, now abandoned and refiled as continuation application Ser. No. 08/484,256 on Oct. 17, 1994, still pending, and divisional application Ser. No. 08/470,903 on Jun. 6, 1995, now U.S. Pat. No. 5,624,293.

The present invention is directed to a significantly improved liquid crystal display (LCD) having a flat panel of microlamps to provide the light source for the display.

BACKGROUND AND SUMMARY OF THE INVENTION

This application is directed to gas discharge lamps and displays and methodology for producing such lamps, having first and second substrates of transparent material capable of withstanding heat and pressure; at least one of the substrate has at least one cavity; luminescent gas discharge material is placed in the cavity; the first and second substrates are wafer bonded together such that the substrates are joined together at all points of contact.

Lamps

Gas discharge lamps (mercury vapor, sodium vapor, metal halide) are an important segment of the lighting industry. It is well known that the luminous efficacy of gas discharge lamps increases substantially at high pressures (1– 200 atmospheres). However, the containment of such high pressures in a transparent vessel has presented significant problems. Gas pressure is restricted in many instances because of the difficulty of finding materials that are sufficiently lightweight, while at the same time capable of withstanding high heat and pressures. Furthermore, such materials, to be practicable, must be capable of relatively inexpensive mass production. The usual construction of gas discharge lamps is to suspend a translucent pressure and heat resistant discharge vessel by means of a metal framework within an outer glass bulb.

The invention provides an entirely new paradigm for the construction of high pressure gas discharge lamps and displays. Rather than a discharge vessel mechanically suspended within an outer bulb, the invention is directed towards methods of fabricating high pressure "microlamps" utilizing micromachining techniques which are similar to integrated circuit fabrication techniques such as the etching of and bonding of planar substrates. The invention is directed to an improved gas discharge lamp that can withstand very high pressures and the method of making such a lamp by means of integrated circuit manufacturing techniques. The lamp is manufactured from two planar sheets of temperature and pressure resistant transparent material. A cavity is etched in one or both of the sheets and electrodes are therefore deposited or placed in the cavity. The cavity is charged with a filler appropriate to the type of lamp being manufactured such as mercury, sodium or metal halides. The two sheets are then bonded together so as to seal the cavity within the sheets. Contact may then be made with the electrodes to activate the lamp. Electrodeless lamps activated by microwave energy may also be manufactured by this technique. Miniature gas discharge lasers may also be produced by this technique.

The term "bonding" as used herein refers to "wafer bonding" techniques used in the manufacture of integrated circuits and sensors. Such techniques generally comprise anodic or fusion bonding which results in a chemical bond at the interface which is as strong as the bulk material. This bond permits the fabrication of cavities which can withstand extremely high pressures (greater than 200 atmospheres). In this technique, a bond is present at all points of contact between the substrate surfaces. So that each cavity is individually sealed.

There are two types of wafer bonding processes. Anodic wafer bonding or fusion wafer bonding. Fusion wafer bonding: In this process two flat wafers (e.g. quartz) are prepared with hydrophilic surfaces and brought into contact. The Van de Waal's forces pull the two wafers together and result in a bond at the interface. The two wafers are then annealed at high temperature (e.g. 1000° C.), resulting in a chemical bond at the interface, which has the strength of the bulk material. Even though the temperature is elevated, bonding takes place at a temperature below the melting point of the material (quartz: approximately 1400° C.). This means that the substrate will not deform during the bonding process. Anodic wafer bonding: In this process, two flat wafers are brought into contact as in the fusion wafer bonding process. However, the annealing is carried out at lower temperatures and with an electric field applied across the wafers. This process is useful for materials that have mobile ions and cannot be annealed at high temperatures (such as glass). The electric field results in the collection of positive and negative charges at the interface, which lead to high electric fields, which pull the wafers together. This process is more forgiving of the degree of wafer flatness, but is more difficult to implement and does not work with materials that are free of mobile ions.

The present development has implications for fluorescent lamps as well. Fluorescent lamps fabricated by using wafer bonding will not only be much sturdier, but the internal pressures can exceed 1 atmosphere. This is because flat fluorescent lamps made by the present technology will be bonded everywhere, except where the discharge space is located. As noted above, this bond will have the strength of the bulk material. This allows the lamp to be optimized in a sub-normal "glow" discharge mode, where the optimum pressure for the discharge can exceed 1 atmosphere for short electrode spacing or narrow walls. Glass frit sealing (at the edges) in the prior art is a mechanical process, which cannot easily be used to make small individually sealed cavities (e.g. 100 micron diameter) and which is not a batch production process. On the other hand, the wafer bonding process can be used with IC techniques to make extremely small individually sealed cavities (<100 micron diameter) and is a batch process which is fully compatible with IC techniques. The present development also permits the phosphers that fluoresce to be located either inside the discharge cavity (as in current fluorescent tubes) or outside of the cavity.

Displays

Emissive, large area displays are expected to have applications in the large flat panel television market, particularly for high definition television. Plasma displays are promising candidates for this application. Plasma displays are constructed by patterning orthogonal electrodes on glass substrates, placing spacers between the glass substrates, sealing the substrates at the periphery and filling the space in between the substrates with the working gas. In another version of a plasma panel, a glass sheet with holes cut through it is placed between electrode substrates. As a result, individual discharges are confined to the holes in the middle sheet. However, the seal is still made at the periphery and the gas is filled from a small opening at the periphery, which is thereafter sealed. In both types of structures, however, the individual pixels are not sealed from each other. Such conventional plasma displays or back-lights are shown in Patent Publications WO 90/09676, WO 87/04562, EP 0,302, 748 and EP 0,467,542 A2.

Since the conventional displays are large, the gas fill pressure cannot be much more than one atmosphere, as the forces on the glass substrate are too great and will either force the substrates apart, or shatter them. For example, in a panel measuring 1200 sq in (30×40 in), only 0.1 psi of pressure over 1 atmosphere will result in an outward force of 120 lbs on each substrate. Therefore, the gas fill in these substrates must be restricted to a maximum pressure of 1 atm. At the same time, one of the key problems plaguing the plasma panels is low brightness for TV applications because of the lower pressure at which they must be operated.

This application is directed to a display technology based on micromachining, that will yield bright, efficient and rugged displays for TV applications. In this construction, the individual pixels are completely isolated from each other. The individual pixels are formed by etching and bonding of the transparent substrates (glass, fused quartz, sapphire, PCA or others), so that the pixels are comprised of sealed cavities containing electrodes and the ambient gas or dosing material. Since each pixel is a sealed cavity, which is formed by bonding the etched substrates, the bonded interface is as strong as the bulk of the substrate and the pressure within such a pixel can be substantially more than one atmosphere.

The improved construction can readily provide higher pressure discharges, which can emit substantially more light. This is particularly advantageous for HDTV applications, where pixel sizes need to be small (<300 um), even for large area displays. However, it is difficult to use mechanical processes economically to make small but deep apertures. Furthermore dry chemical etching processes are too slow and also too expensive. Therefore, the pixel cavities must be made by wet chemical etching, which is isotropic and results in etched cavities whose lateral dimensions are roughly twice the depth. Therefore, the spacing between electrodes must be kept small. However, in order to optimize the UV radiation from xenon, it has been demonstrated that the ratio of electric field to pressure (E/p) is 7–8 V/cm.torr. Therefore, for driving voltages of 60 V and electrode spacings less than 100 um, the optimum pressure is more than one atmosphere which is not obtainable with prior manufacturing processes.

Although, the discussion so far has assumed that the discharges are in the "glow" phase, another advantage of this technology is that the pixels can be operated as high pressure arc lamps. It is well known that these high pressure arc lamps have significant output in the visible. Therefore, the pixels can be used with color filters to form a display, thus avoiding the use of phosphors. When the discharge is operated in the "glow" phase, the electrodes do not get very hot, however, when the discharge is operated in the "arc" phase, the electrodes get hot, thus the choice of the metal for the electrodes is a function of the desired operating range. Additionally, in the arc phase, re-ignition is a problem, but it can be avoided by use of an auxiliary discharge, which is hidden from view, but connected to the display discharge space as was done in prior panels.

U.S. Pat. No. 4,990,826 is directed to a display device. In this patent, channels are formed by etching through one plate and placing it in contact with two plates on which electrodes have been formed. The three plates are then sealed together by heating. Because of the electrodes, the seal can only be formed by softening the glass so it can flow around the metal electrode and form a seal. Such heating may unacceptably deform the entire structure. In U.S. Pat. No. 4,990,826, a vacuum port is also sealed into the device with glass frit. The discharge space is evacuated and filled through this port and then sealed by melting the pumping port tube.

The discharge space in the present invention is formed by wafer bonding two or more plates together. In the present electroded lamps, the electrodes are sealed and the surface of the wafer is planarized by using wafer planarizing methods to deposit glass or $SiO_2$ films. The planarized wafers are then bonded together to seal the discharge space. Since the wafer bonding is carried out in the atmosphere required in the discharge space (e.g. Ar, Ne, Xe, etc.), the atmosphere is sealed into the cavity and a port is not required. Therefore, the present process allows the formation of many individually sealed cavities on one substrate, whereas the process described in U.S. Pat. No. 4,990,826 does not. The present process has the advantages of batch processing whereas the prior art does not. The formation of a seal by wafer bonding also has practical advantages over glass softening, in that the structure will not deform during wafer bonding but will during softening of the glass as in U.S. Pat. No. 4,990,826.

The use of a panel of microlamps, according to the present invention, in a flat panel array has been found to be extremely attractive for liquid crystal displays. The array of microlamps according to the present invention enables a higher screen brightness of optical transmission in Active Matrix Liquid crystal Displays (AMLCDs). Typically, such AMLCDs have an optical transmission of less than 30% because of an array of color filters and polarizers over the AMLCD. Further, use of TFT arrays in such displays cause a low aperature ratio.

These problems of conventional AMLCDs require a high intensity light source, particularly in projection systems, in order to obtain a reasonable screen brightness. The array of individual micro-light sources of the present invention solves these problems. The individual microlamps have a reflector integrated with the micro-light source and a micro-lens to project and focus the light into each pixel or at most several pixels of the LCD. The combined array of individual microlamps provides a large area light display of high intensity light. This significantly improves the use of flat panel LC displays and enables improved projection displays as well as forming a useful area spot lighting arrangement.

Accordingly, the present invention is directed to a flat panel light source of microlamps.

In addition, the present invention is directed to a liquid crystal display having a flat panel light source.

Further, the present invention is directed to an area lighting scheme using a microlamp arrays.

In particular, the flat panel light source of the present invention comprises an array of microlamps having a micro-reflector for each microlamp light source cavity directing light through a micro-lens associated with the light source. An array of such microlamps is provided to direct light through a LCD, such as used in projection displays. Finally, such an array of microlamps according to the present invention is provided as an area lighting scheme.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENT

Figure 1:
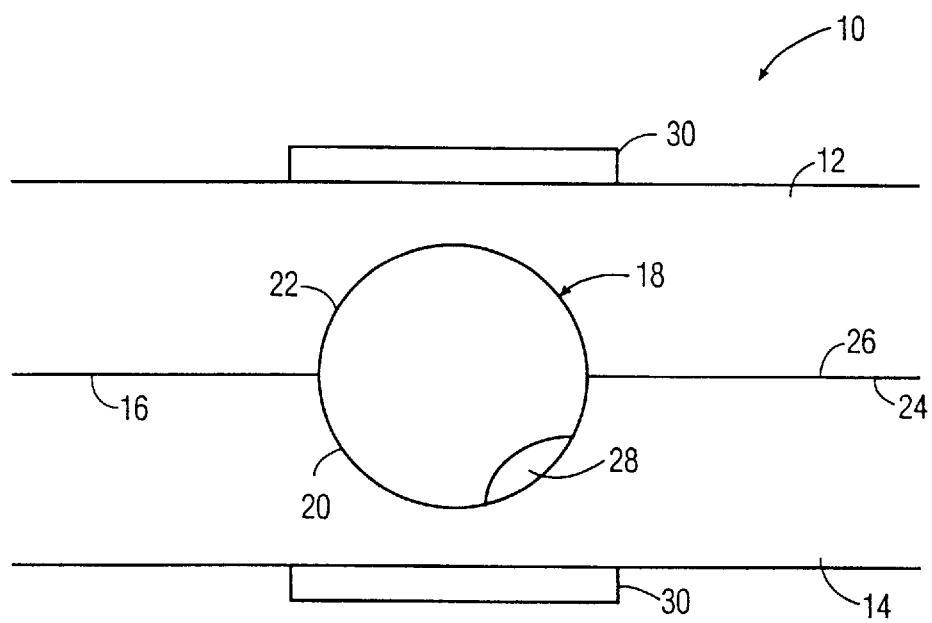
FIG. 1 is a sectional diagram of an electrodeless, radio frequency activated lamp constructed in accordance with the present invention.
Figure 2:
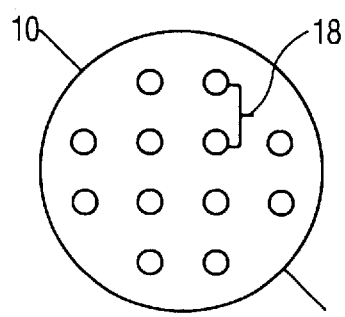
FIG. 2 is a plan view of the translucent substrates having a plurality of lamp cavities disposed therein.

FIGS. 1 and 2 illustrate high pressure discharge lamps fabricated in accordance with the present invention. As shown in FIGS. 1 and 2, a lamp 10 is fabricated from a first: planar substrate 12 and a second planar substrate 14 which are bonded together by suitable means, as described below, and each lamp 10 comprises a plurality of cavities 18 which form individual luminescent micro-lamps. In FIGS. 1 and 2, the cavities 18 are depicted as generally spherical and the substrates 12 and 14 are depicted as circular in plan view. It should be kept in mind that the cavities and substrates may be of any size and shape. The substrates are depicted as circular since handling equipment for circular plates is readily available from makers of integrated circuit manufacturing equipment. Cavities 18 may be square, rectangular, serpentine, elongated channels, or other shapes.

FIG. 1 illustrates a lamp constructed in accordance with the present invention in its simplest embodiment, that of an electrodeless RF activated lamp. The steps of manufacturing the lamp will also be discerned from this figure. Planar substrate 14 is transparent and consists of material suitable for containing the pressure and temperature of an operating lamp, one such suitable material is fused quartz. Cavity 18 which comprises a half cavity 20 in substrate 14 and a half cavity 22 in substrate 12 is formed by integrated circuit manufacturing techniques.

The upper surface 24 of un-etched substrate 14 is covered by suitable masking material, such as polysilicon, at the portions where etching is not desired, as etching will occur at the unmasked portions. Thereafter, the masked substrate is exposed to an etchant such as hydrofluoric acid for a time suitable to create cavity 20. The time and amount of exposure to the etchant may be adjusted, in the known manner, to provide the cavity size and shape desired. Upper substrate 12 is also masked and etched in a similar manner to provide half cavity 22. For most applications, substrate materials are commonly available with sufficient flatness (so called 10 micron flatness) such that they will bond by Van de Waal attraction. However, for certain bonding processes, it is desirable that the surfaces of substrates 12, 14 that are to be bonded together be planarized. This can be accomplished by depositing phosphorus doped silicon dioxide and polishing the surface. Alternatively a smooth surface can be obtained by depositing phosphorous doped silicon dioxide and reflowing (heating) it.

After the formation of cavities 20 and 22 in substrates 12 and 14, respectively, cavity 20 is charged with a suitable luminescent material. In this embodiment, the lamp is a mercury lamp so that an appropriate sized drop of mercury 28 (or mercury amalgam) placed in cavity 20. If cavity 18 is to be charged with a gas such as Argon, the bonding of substrates 12, 14 may take place in an argon atmosphere at a pressure suitable for the final lamp. Accordingly, substrates 12 and 14 are placed in a pressure vessel at the appropriate argon pressure for the lamp to be manufactured. Thereafter, lower surface 26 of substrate 12 is bonded to upper surface 24 of substrate 14. The bonding interface 16 may be formed by any suitable means such as fusion or anodic bonding (as described above). After the bonding is completed, the completed lamp 10 is removed from the pressure vessel and cavity 18 will contain an argon atmosphere having a charge of mercury that will vaporize and form a mercury vapor lamp upon energization. Since this is an "electrodeless lamp", the mercury is vaporized and luminesces by application of RF energy from external RF electrodes 30 which may or may not be physically attached to the lamp. By the use of the wafer bonding process, each cavity 18 is individually sealed, that is, the substrates are chemically bonded to each other at all points of contact between the substrates.

Figure 3:
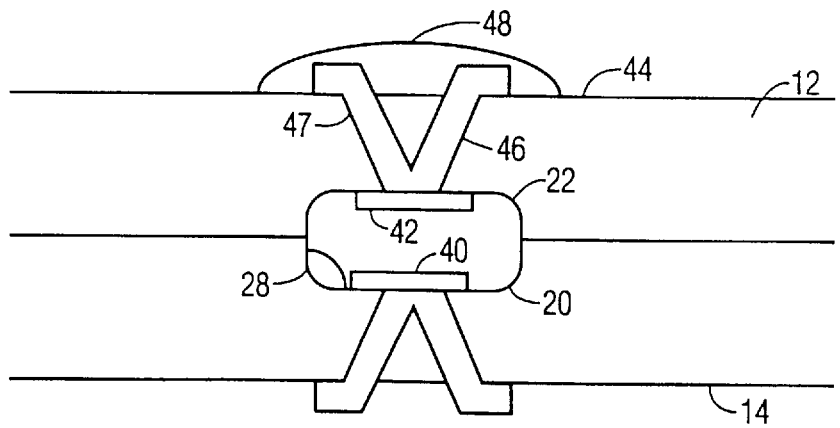
FIG. 3 is a sectional view of a lamp having opposed electrodes manufactured in accordance with the present invention.

FIG. 3 illustrates how the present invention is used to produce a lamp having electrodes which is a more common design than the RF lamp of FIG. 1. In FIG. 3, the same reference numerals are used to indicate the same structure that: of FIG. 1. In FIG. 3, each half cavity 20, 22 in substrates 14, 12 is produced by masking and etching in a similar manner as the lamp of FIG. 1. After the etching of the half cavities 20, 22 a further manufacturing step takes place: the deposition of electrodes 40 and 42 in cavities 20, 22 respectively. The electrodes may be composed of any suitable electrode material, such as tungsten, and are deposited by known metal deposition processes, i.e. masking, etching and deposition of material. Since electrodes 40, 42 must be connected to current, electrical connection must be made to electrodes 40, 42. Connection with electrode 42 is made by etching a channel 46 in the upper surface 44 of substrate 12. In this case, upper surface 44 is masked at the areas to remain unetched and an etchant acts on the unmasked portions to etch channel 46 into surface 44 down to the electrode 42 to expose its rear surface. Thereafter, by deposition and patterning, a coating of conductive material 47, which may be a metallic or non-metallic conductor is applied in channel 46. Coating 47 extends from the electrode 40, 42 to the outer surface of the respective substrates. In order to maintain the pressure integrity of cavity 18, "plug" material 48 such as glass is deposited over metal layer 46 to strengthen cavity 18 and to render the outer substrate surfaces flush. Thereafter, substrates 12, 14 are charged with the appropriate fill or dosing material and bonded as is described above with respect to the lamp of FIG. 2. Connection of electrodes 40, 42 to an appropriate source of electric potential will cause the lamp to illuminate. Additional pairs of electrodes, such as starter electrodes, may also be deposited and connected in a like manner.

Figure 4:
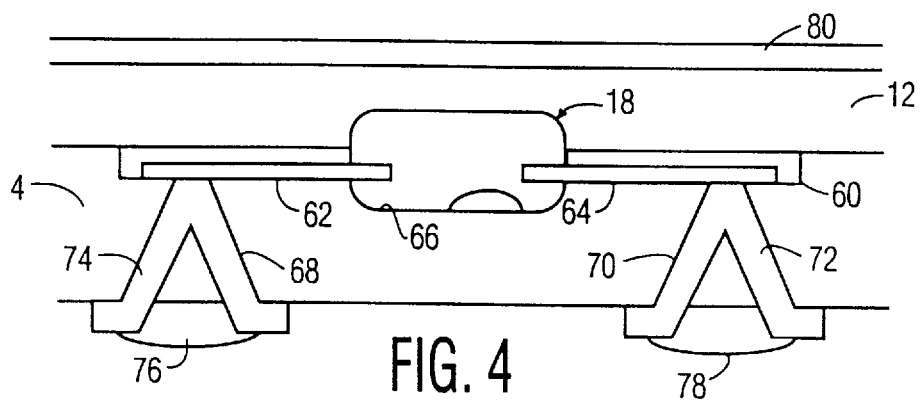
FIG. 4 is a sectional view of a side electrode lamp manufactured in accordance with the present invention.

FIG. 4 illustrates another embodiment of the present invention in which the electrodes are disposed in side-by-side relationship, the same reference numerals are again used to denote similar structure. As shown in FIG. 4, the upper substrate 12 is formed in a similar manner to the previous embodiments. However, lower substrate 14 is first masked and etched so as to form a relatively wide rectangular cavity 60 and electrodes 62, 64 are deposited on its flat lower surface. A second deeper central cavity 66 is then etched into substrate 14 by suitable masking and etching techniques, and by use of an etchant which does not attack the material of electrodes, 62, 64. These electrodes will overhang cavity 66. Thereafter, the lower surface of substrate 14 is etched to create channels 68, 70 which contact the lower surface of electrodes 64, 62 respectively. A conductive layer 72, 74 may then be deposited in channel 68, 74 for electrical connection to electrode 64, 62. Thereafter, plug material 76, 78 may be used to fill in the gap between the lower surface of substrate 14 and metallic: layers 72, 74. The cavity 18 is then charged. The lower surface of substrate 12 is then bonded to substrate 14 in the manner described above.

The present structure and methodology also lends itself to the manufacture of miniature fluorescent bulbs which utilize a phosphor coating which, when energized by the ultraviolet rays generated by mercury vapor, will fluoresce. In FIG. 4, a phosphor layer 80 is deposited on the upper surface of substrate 12. Such placement will prevent contamination from the mercury, as the external phosphor may easily be protected by a coating layer or an additional substrate. Alternatively phosphors could also be deposited within cavity 66. The lamp shown in FIG. 4 has both electrodes disposed in a single substrate and the electrical connections are made on a single substrate. It is also noted that in the construction of this type of lamp, there need not be a half cavity disposed in substrate 12 because if the portion of the cavity disposed in substrate 14 is large enough, upper substrate 12 may be merely a flat piece of fused quartz or other substrate material.

Figure 5:
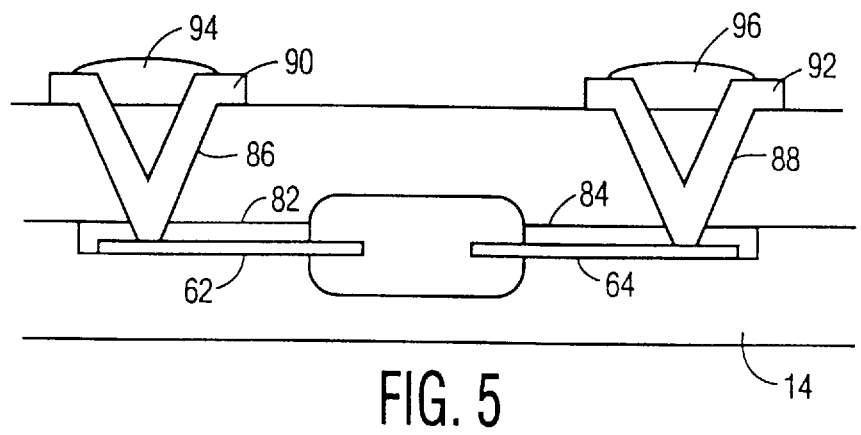
FIG. 5 is a sectional view of a further embodiment of a side electrode lamp constructed in accordance with the present invention.

FIG. 5 shows yet another variant of the side electrode lamp of FIG. 4. In the lamp shown in FIG. 5, the lower substrate 14 further includes deposition of layers 82, 84 of P-glass (phosphorus doped glass) which cover electrodes 62 64- to a level equal to the upper surface of substrate 14. Thereafter, the upper substrate 12 has channels 86, 88 etched through substrate 12 and through the P-glass layers 82, 84 so as to expose the upper surface of electrodes 62, 64. Thereafter, conductive layers 90, 92 and plug material 94, 96 are deposited in channels 86 and 88. This arrangement permits contact with and connection to electrodes 62, 64 through the upper surface of the device rather than the lower surface of the device as shown in FIG. 4. The use of P-glass also provides an efficient sealing of the electrodes to the substrate.

Figure 6:
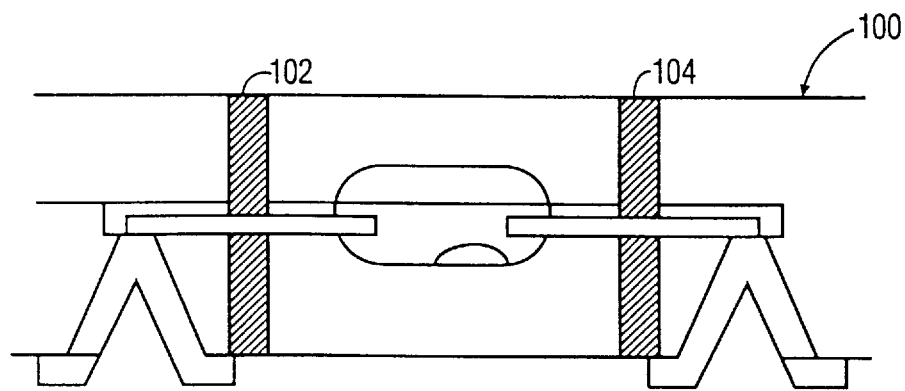
FIG. 6 is a sectional view of a side electrode lamp including melt zones to further seal the electrodes.

FIG. 6 illustrates a side electrode lamp 100 which is constructed similar to that of FIG. 4 with the addition of melt zones 102, 104 which are used to further seal the electrodes within the substrates. Melt zones 102, 104 are formed by exposing the completed lamp to a $CO_2$ laser which will melt the fused quartz substrates to seal the tungsten electrodes firmly therewithin. Additionally, a layer of molybdenum may be added to the tungsten electrodes to aid in sealing. The molybdenum layer may be placed adjacent to the tungsten, in contact with the tungsten, or it may be deposited on top of the tungsten. The molybdenum layer will assist the substrate/electrode seal with or without melt zones 102, 104.

As noted above, lamps fabricated by this methodology may be any type of gas discharge lamp. The material suitable for the substrates is also not required to be fused quartz, as any transparent or translucent material capable of withstanding the heat and pressure generated by the particular lamp design (such as PCA or sapphire). In certain circumstances, glass (or quartz glass) is a suitable substrate for use with the certain types of lamps. The number of cavities disposed in the substrate may be varied in accordance with the requirements of the application. The lamps may be used as illumination or as display. Finally, the lamps can be energized all at once or circuitry can be disposed on the substrate so as to provide non-simultaneous activation of the various microlamps disclosed in the substrate.

Figure 7:
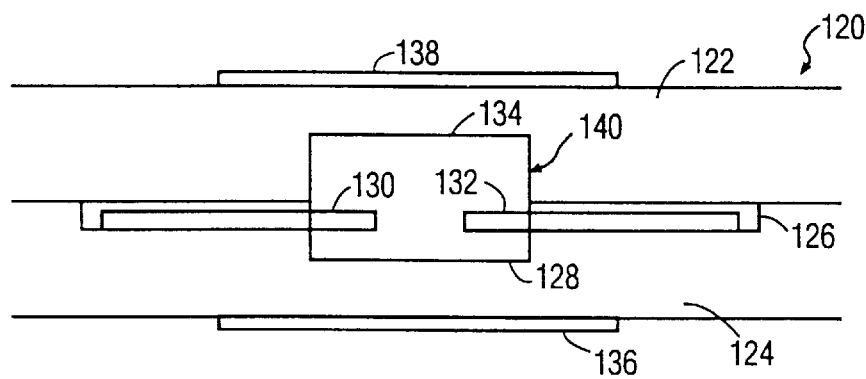
FIGS. 7 and 8 are sectional views of micro-lasers constructed in accordance with the invention.

FIG. 7 illustrates a micro-laser constructed in accordance with the invention. Micro-laser 120 is constructed, as are the previous gas discharge lamps, from an upper substrate 122 and a lower substrate 124. Lower substrate 124 has a first, relatively shallow channel 126 disposed thereon and a second deeper channel 128 at its centermost portion. By etching and deposition techniques similar or identical to those described above extending into channel 128 are first and second electrodes 130, 132. Similarly upper substrate 122 has a channel 134 formed therein. Mounted to the exterior of substrate 124 is a partially reflective mirror 136 formed by metal deposition, photolithography, etching and other techniques. Disposed on the upper substrate 122 is a fully reflective mirror 138. A central cavity 140 is formed by the half cavities 128, 134 and may be charged with gaseous material which will lase under application of electrical input applied on electrodes 132, 130.

When a discharge is created between electrodes 130, 132 within cavity 140 the action of mirrors 136 and 138 will provide a lasing action such as to cause the atoms of the gaseous material to lase as is known to those skilled in the art of gas discharge lasers. Thus, partially reflective mirror 136 and fully reflective mirror 138 form an optical cavity for the excitation of atoms of the gaseous fill material. Suitable gaseous fill material are those usually utilized in large size gas discharge lasers. Such material includes $CO_2$, Helium-Neon, Argon and the like. By suitable selection of the gaseous material and by the size and properties of the optical cavity, the lasing frequency may be adjusted over a wide frequency range. Such frequencies can range from the infrared to the ultraviolet. Gas discharge lasers are capable of generating light of a blue frequency or higher which, at this date, are difficult for solid state devices. Micro-lasers constructed in accordance with this invention can also be "electrodeless". Such lasers can be pumped through the application of external RF or microwave energy.

Figure 8:
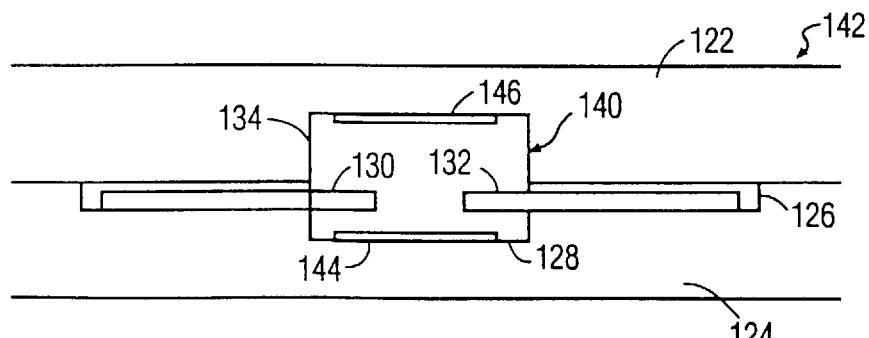

FIG. 8 shows another embodiment of a micro-laser constructed in accordance with the present invention. In FIG. 8 the same reference numerals are used to indicate the same structure as that of FIG. 7. In the laser structure of FIG. 7, mirrors 136 and 138 were disposed external to the substrates. The present invention does not require that the mirrors be disposed externally of the optical cavity. FIG. 8 illustrates a laser structure including mirrors disposed in cavity 140. In FIG. 8 a partially reflective mirror 144 is disposed on the lower surface of cavity 128 in lower substrate 124. A fully reflective mirror 146 is disposed on the upper surface of cavity 134 in upper substrate 122. The mirrors used in the structures of FIG. 7 and FIG. 8 may also be constructed from metallic materials which may be deposited within the substrates. It is to be further noted that the mirrors utilized in construction with the micro-lasers of FIG. 7 and FIG. 8 need not have planar surfaces. The mirror surfaces could be curved in accordance with any special requirements. Furthermore the mirrors can be spaced apart from the substrates and need not be mounted thereto. A particularly suitable substrate material for use in a laser device is sapphire. Since sapphire is crystalline anisotropic etching can provide mirrors with superior optical qualities.

Figure 9A:
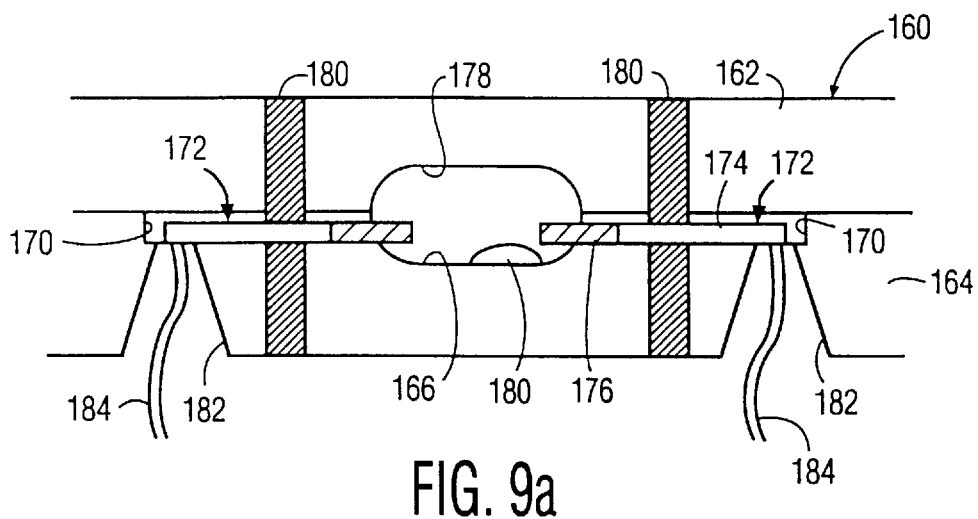
FIGS. 9a and 9b are sectional views of lamps constructed in accordance with the present invention using conventional electrodes.

The present development is also adaptable for use with conventional, rather than deposited, electrodes. As shown in FIG. 9a a discharge lamp is constructed using conventional small electrodes. Lamp 160 includes an upper substrate 162 and a lower substrate 164 which may be of materials, as described above, which are suitable for withstanding the discharge conditions, such as glass, quartz or sapphire. Lower substrate 164 is masked and etched, in a manner similar to that described above, so as to provide a lower half cavity 166. Thereafter, lower substrate 164 is masked again and etched so as to provide shallow trenches 170 on each side. Shallow trenches 170 are used to mount conventional electrodes 172 which consist of a molybdenum pad 174 welded or otherwise joined to a tungsten wire 176. Tungsten wire portions 176 of electrodes 172 may have emitters such as thorium, barium titanate, barium zirconate or other emitter sources contained within (i.e. it is a composite material) or they may have emitter containing material welded onto the tips or coated on top. If the type of lamp requires it a second pair of electrodes, such as starting electrodes, may be placed in trenches 168, 170 before the bonding of substrates 162, 164.

Upper substrate 162 is masked and etched so as to provide an upper half cavity 178. The mercury fill 180 is placed in half cavity 166 and thereafter upper substrate 162 and lower substrate 164 are bonded together, by a fusion bonding process in an argon (or other fill gas) environment. In this process the wafers are annealed in an appropriate high pressure atmosphere so as to counter the mercury pressure which increases due to the vaporization of the mercury upon annealing. The annealing process forms a permanent bond at the interface between substrates 162, 164.

After annealing, substrates 162, 164 are then heated with a laser or a microtorch at melt zones 180 to seal the molybdenum pads 174 to substrates 162, 164. Thereafter, channels 182 are etched in the lower surface of substrate 164 and extend to electrodes 172 to permit lead wires 184 to be attached to the now exposed molybdenum portion 174 of electrodes 172.

Figure 9B:
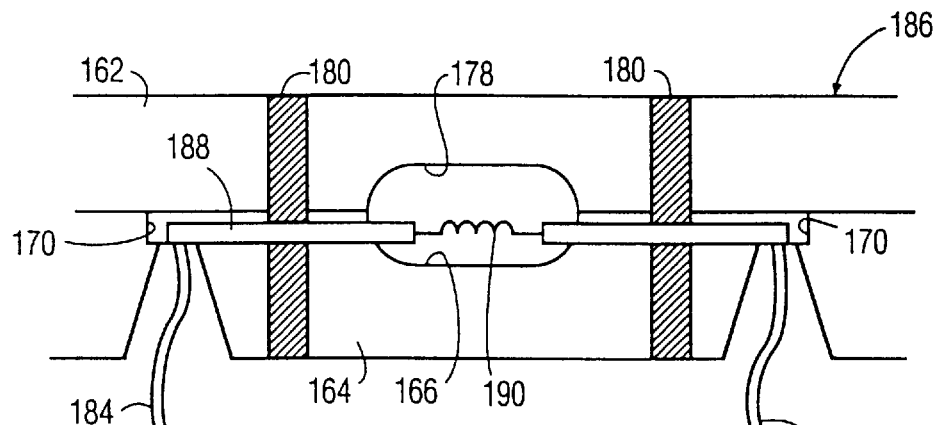

FIG. 9b illustrates another "conventional electrode" lamp constructed in accordance with the present invention. FIG. 9b illustrates a filamented, incandescent lamp 186. The same reference numerals as used in FIG. 9a are used to illustrate the same structure in FIG. 9b. In FIG. 9b molybdenum pads 188 are connected by a tungsten filament 190 when cavity 178 is charged with an inert gas, such as argon and a halogen to support the tungsten-halogen transport cycle, a halogen lamp is formed. Of course, many other types of filamented incandescent lamps may be utilized with the construction shown in FIG. 9b.

Figure 10A:
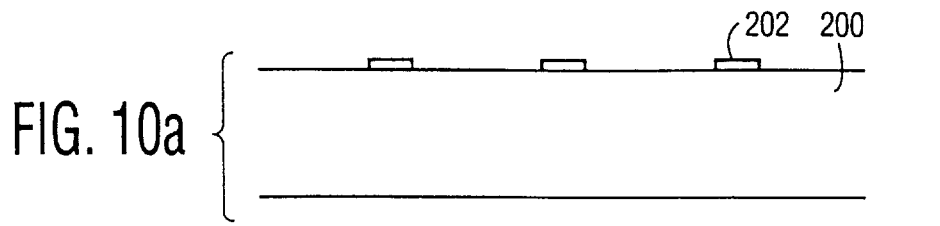
FIGS. 10a–10d illustrate a first construction for a gas discharge display panel in accordance with the present invention.
Figure 10B:
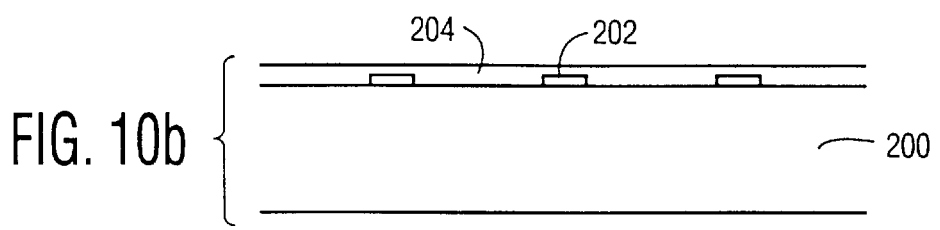

FIGS. 10a–10d illustrate a first construction for a flat panel gas discharge display in accordance with the invention. The display construction begins with a first translucent or transparent substrate 200 upon which a series of metal first electrodes 202 are deposited and which extend across what will be the surface area of the display. First electrodes 202 are patterned and deposited in the manner described above with respect to the manufacture of lamps. The choice of the metal to be used in first electrodes 202 is determined by the operating conditions of the discharge and first electrodes 202 can be deposited by thick or thin film techniques. Thereafter, the surface of substrate 200 and first electrodes 202 is planarized by using planarizing techniques such as spin-on glass or the deposition of a phosphorous doped $SiO_2$ (p-glass) 204 followed by an annealing step to harden same. The substrate, metal first electrodes 202 and planarizing layer 204 are shown in FIG. 10b.

Figure 10C:
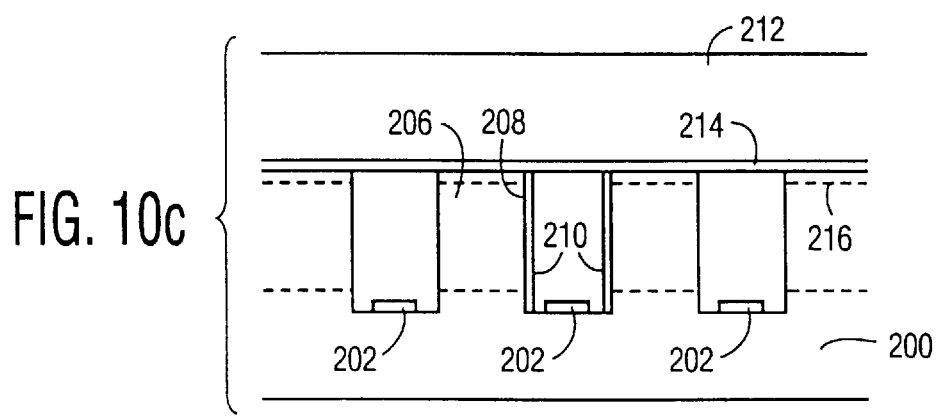

Substrate 200 is then bonded to an intermediate substrate 206 in which a series of cavities (holes) 208 have been etched (or otherwise produced in) with the same spacing as that of electrodes 202 (see FIG. 10c). The sidewalls of the etched cavities 208 may be deposited with a phosphor 210, or other luminescent material if required by the display. The bonding of substrate 200 to perforated substrate 206 is accomplished by wafer bonding techniques such as fusion bonding or anodic bonding (described in detail above). The wafer bonding of substrates 200, 206 will join them together at all points of contract, other than at holes 208. After bonding of substrate 200 to substrate 206, the planarizing layer 204 is removed in the area of cavities 208 over first electrodes 202 which will expose electrodes 202 in cavities 208 of the display. The planarizing layer 204 can be removed in cavities 208 by the usual masking and etching techniques using photolithography or it could be left unremoved with a discharge formed by capacitive coupling.

Figure 10D:
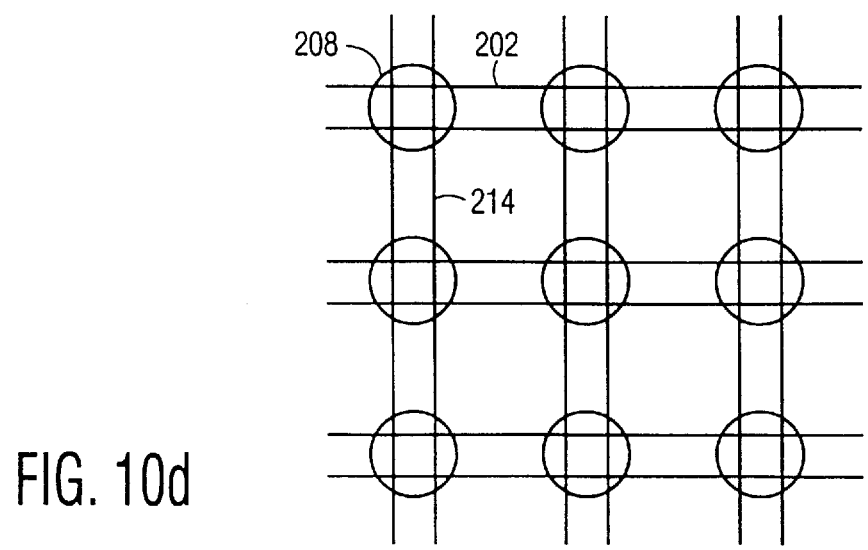

Thereafter a third substrate 212 is prepared. Patterned and deposited on substrate 212 are a second pattern of metal electrodes 214 which in the final form will extend perpendicularly (orthogonally) to first electrodes 202. Substrate 212 is thereafter planarized with a planarizing layer 216. A masking and etching step is then used to remove the planarizing layer 216 in the areas that will be within discharge cavities 208. Finally, substrate 212 is wafer bonded to substrate 206 (which is already bonded to substrate 200), to form the finished display. This final bonding is carried about in the ambient atmosphere which is to be sealed into the individual cavities (i.e., argon, xenon, neon and/or helium for a plasma display). Any other necessary dosing material can also be placed in cavities 208 prior to forming the final wafer bond. As is shown in FIG. 10d (which is a plan view of the finished assembly), the assembly consists a plurality of cavities 208 disposed within the display with the electrodes 202, 214 running perpendicular to each other and intersecting at cavities 208 (pixels). The width of electrodes 202, 214 is exaggerated so as to illustrate the construction. In practice, electrodes 202, 204 need not be as wide so as to not obscure the light emitted by individual cavities 208 (pixels). The three substrates may be formed by any suitable material such as glass, with quartz or sapphire utilized if the type of discharge requires it.

Figure 11A:
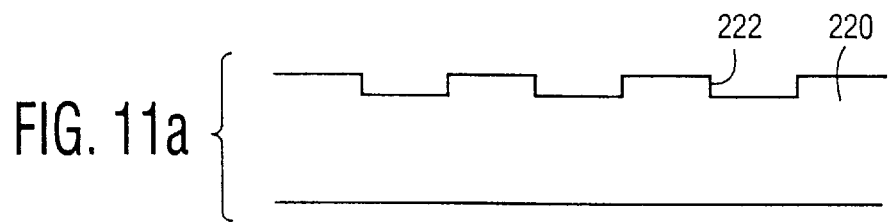
FIGS. 11a–11d illustrate a second construction of a gas discharge display panel.
Figure 11B:
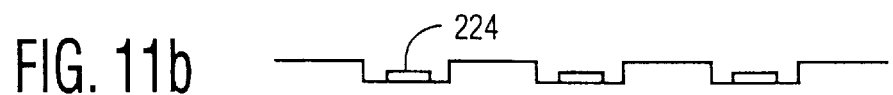
Figure 11C:
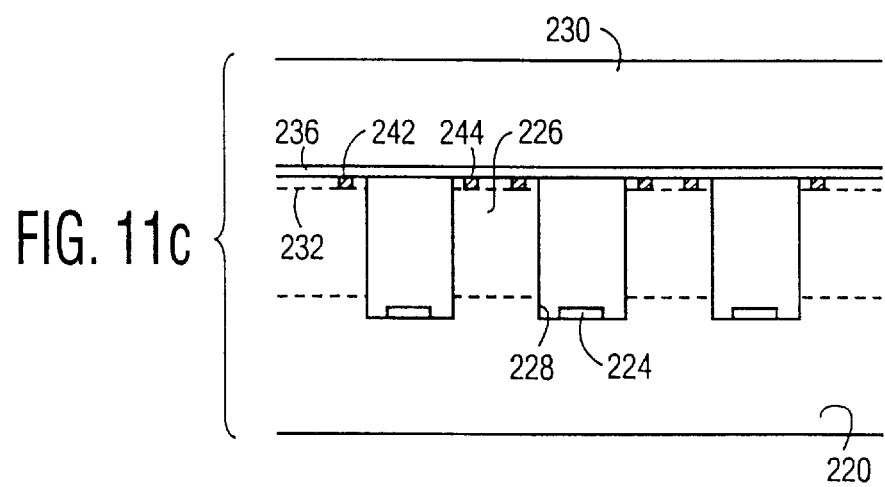

FIG. 11a–11d illustrate a second construction for a gas discharge display in accordance with the present invention. This construction differs from that of FIGS. 10 in that the need for depositing planarizing layers is eliminated. As shown in FIG. 11, a first substrate 220 is etched with a series of trenches 222 in which are deposited first electrodes 224 as shown in FIG. 11b. Thereafter, substrate 220 is wafer bonded to a perforated second substrate 226. Second substrate 226 contains a multiplicity of cavities 228 which will form the individual picture elements (pixels) of the display. The spacing between cavities 228 is the same as between electrodes 224.

Figure 11D:
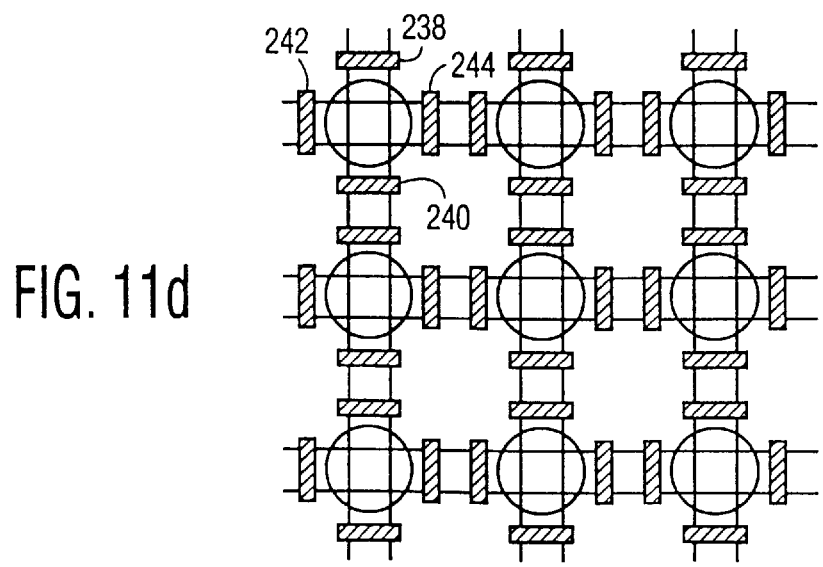

Third substrate 230 is prepared in the same manner as substrate 220, that is a series of trenches 232 are etched therein and second electrodes 236 are deposited therein. Substrate 230 is wafer bonded to the upper portion of substrate 226 and is arranged so that first electrodes 224 are disposed orthogonally with respect to second electrodes 236. Since the electrodes 224 and 236 are disposed in trenches, a proper sealing of cavities 228 is not accomplished by the wafer bonding of the three substrates together. The sealing of cavities 228 is accomplished by means of a $CO_2$ laser. As is seen in FIG. 11d laser seals 238, 240 seal electrodes 224 to substrate 220 while laser seals 242, 244 are utilized to seal electrodes 236. The laser will melt and fuse the material of the substrates around the electrodes to seal each of the cavities. The laser is applied in the ambient atmosphere that is to be sealed within the cavities. The laser beam can be sharply focussed so that the melting of the substrate material takes place only at the aim points of the laser beam and does not affect the integrity of the display as a whole.

Figure 12A:
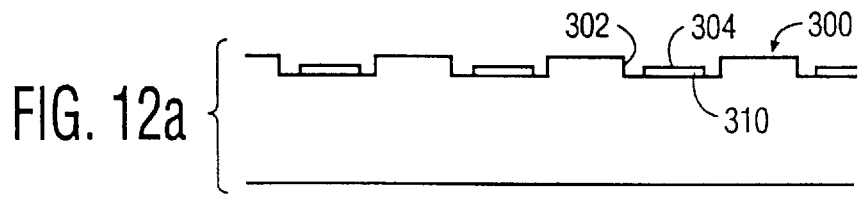
FIGS. 12a–12e illustrate a third type of gas discharge display panel in accordance with the invention.
Figure 12B:
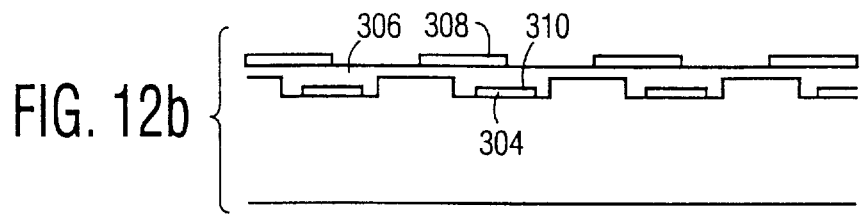
Figure 12C:
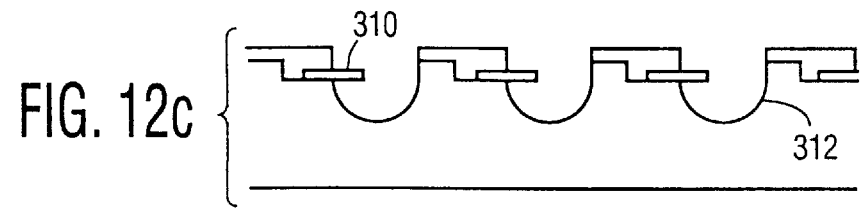

FIG. 12a–12e illustrates yet another construction for a gas plasma display which utilizes two, rather than three, substrates and which disposes the electrodes along the side of the discharge cavities to minimize obstruction. In this construction, a first substrate 300 is patterned and etched with a series of trenches 302 in which a series of metal first electrodes 304 are deposited. As seen in the plan view of FIG. 12e, electrodes 304 have extensions 310 extending laterally therefrom. A planarizing layer 306 is then deposited over substrate 300 and electrodes 304. Thereafter polysilicon masks 308 are deposited over the planarizing layer 306. As shown in FIG. 12b, polysilicon masks 308 extend only partially over extensions 310 of electrodes 304. As shown in FIG. 12c, half cavities 312 are then etched with the polysilicon masks 308 preventing etching thereunder. The etchant used is one which will etch the material of substrate 300 and planarizing layer 306 but does not substantially affect electrode 304. As shown in FIG. 12c after the etching process and the removal of the polysilicon, electrode extensions 310 extend into individual half cavities 312.

Figure 12D:
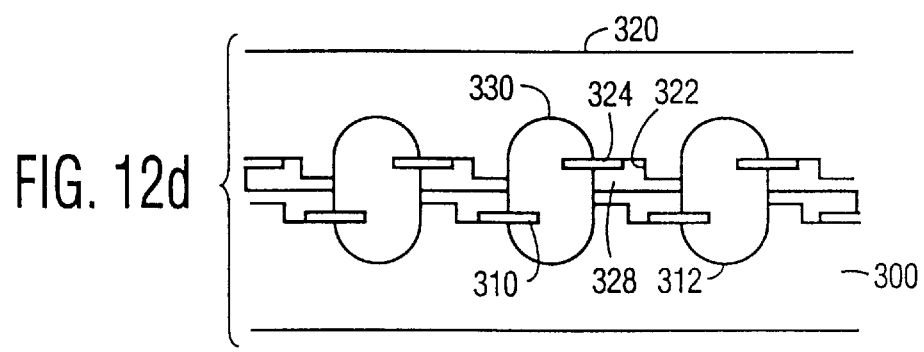
Figure 12E:
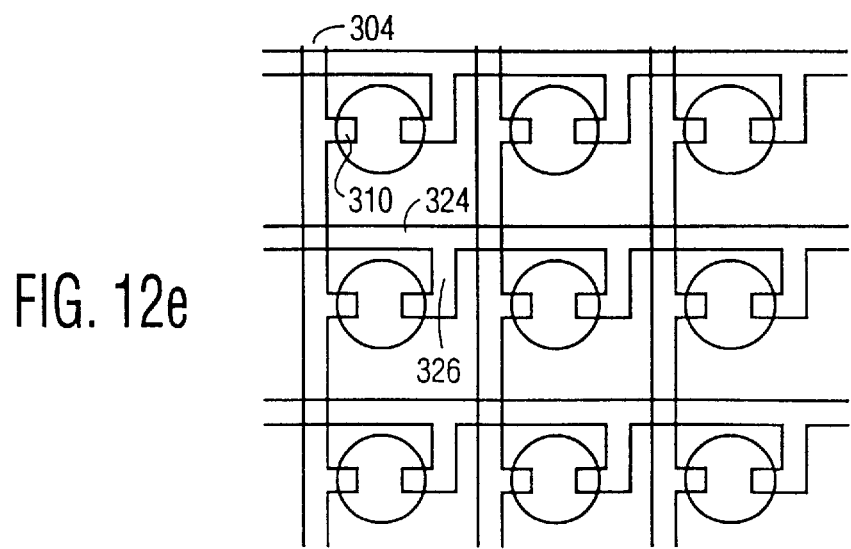

As illustrated in FIG. 12c, the finished substrate 300 has an upper surface which is planar, which permits direct bonding to a second substrate. As shown in FIG. 12d, a second substrate 320 is prepared in a similar manner to that of substrate 300 in that it is etched with a series of trenches 322 and deposited with second electrodes 324 which have a L-shaped extension 326 (see FIG. 12e). Thereafter, a planarizing layer 328 is deposited over electrodes 324 and a polysilicon mask (not shown) is applied which is used to mask the etching of second half cavities 330 in the same manner as described above with respect to substrate 300. After preparation of substrate 320, substrate 300 is wafer bonded to substrate 320 to form the finished sealed cavities as shown in FIG. 12d. As is seen in the top view of FIG. 12e, a plurality of cavities are formed which have electrodes extending laterally thereinto. It is seen that in this view, the electrodes obscure very little of the individual cavities which permits greater brightness from the resulting matrix of pixels forming the display. This construction makes use of planarizing layers, however it is to be noted that the planarizing layers could be omitted and the cavities sealed by laser application as described above with respect to the display of FIGS. 11.

As is seen, the completed panels have upper and lower electrodes arranged orthogonally with respect to each other, i.e. in a row and column arrangement. This arrangement permits each discharge cavity (pixel) to be individually activated (addressed) thus these displays can be used for information or video display purposes. Since each cavity can be individually doped prior to final sealing, appropriate dopants to create various colors or three colors (red, green and blue) for full color displays may be utilized with this technology. Since the cavities will easily contain high pressures greater brightness can be achieved.

Figure 13:
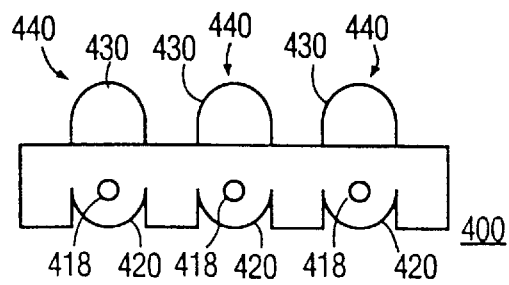
FIG. 13 is a cross-sectional view of a microlamp array according to the present invention.

FIG. 13 shows a partial cross-section of an array 400 of microlamps according to the present invention. This array has a number of microlamps 446 each formed by individual microlamps of a light source cavity 418, a reflective surface 420 and lens 430. This structure is similar to that found in U.S. patent application Ser. No. (1504-0950) filed the same day as the present application and having common inventors.

Figure 14:
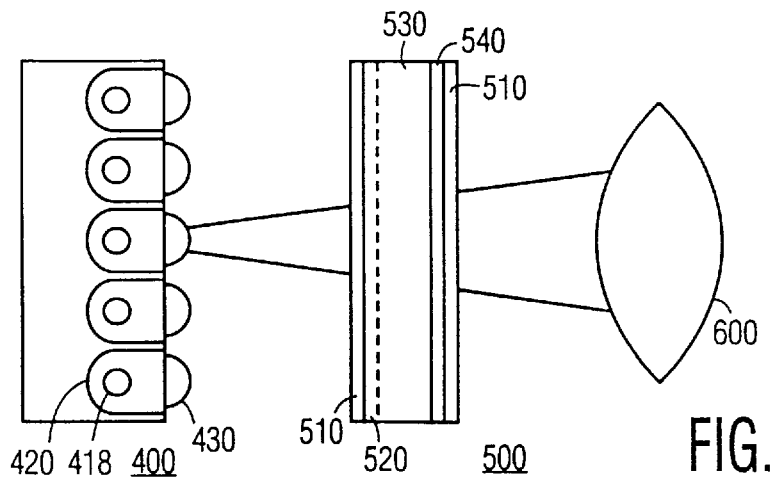
FIG. 14 is a cross-sectional illustration of a microlamp array directing light to a projection LCD according to the present invention.

Such an array of microlamps is used according to the present invention in a projection display, such as the LCD display in FIG. 14. In this structure the microlamp array 400, according to the present invention, directs light from each microlamp to a liquid crystal panel 500. The LCD panel is formed of polarizers 510, TFT electrode structure 520, liquid crystal 530 and electrode 540. Images formed in the LC diplay are projected as light formed from each microlamp 440 through the liquid crystal panel 500 to a projection lens or lens system 600, such as used in projection television devices.

The individual light sources 440 from the array 400 provide high intensity illumination of the liquid crystal display which enhances the final image formed without loss of light as occurs in conventional schemes. That is, the optical transmission of Active Matrix Liquid Crystal Displays (AMLCD) is typically less than 30%. The use of individual microlamps as light sources for the LCD according to the present invention significantly improves light coupling from the light source into the LC display. Moreover, the individual light sources of the microlamp array of the present invention form an expanded light viewing angle for the LCD since each microlamp can focus light into individual pixels of the LCD or at most only several pixels, providing a significant increase in brightness. Thus, significant increases in the amount of light going through the LCD device occur.

Figure 17:
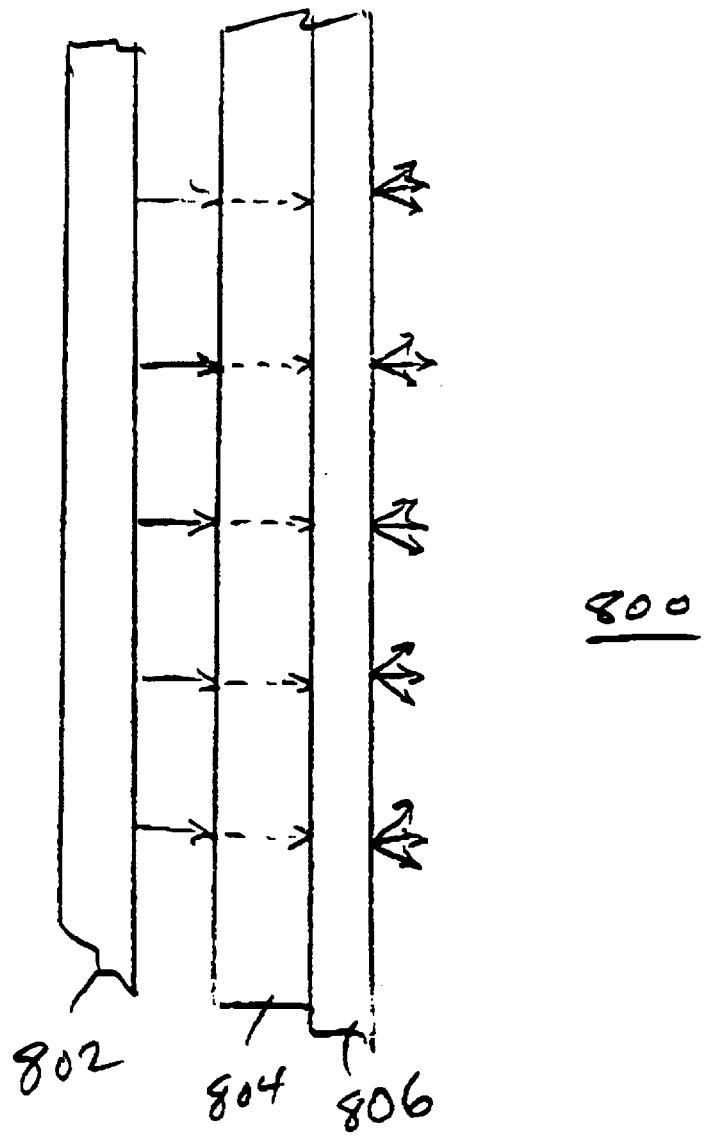
FIG. 17 shows a cross-section of a display device incorporating a microlamp array of the invention.

The formation of such microlamp arrays according to the present invention using ultra-violet (UV) light from florescent type light can produce significant increases in the use of AMLCDs. Such structures using florescent lighting for the individual microlamp light sources enable the provision of direct view flat panel light sources. The resulting structure then provides improved brightness, uniformity of the light and compactness of the display. The distance between the microlamp light array and the LC panel results in variable viewing angles of the display. A UV flat light source having florescent microlamps without phosphors can be used in such displays. In this instance the color phosphors for the display are formed in a pattern on the front of the LC panel and the LC modulates the UV light with the phosphor pattern converting the UV into visible light. Such an arrangement would provide a wide viewing angle light display. FIG. 17 shows such a display device 800, in which flat panel light source fluorescent microlamp array 802 emits UV light, indicated by the solid arrows, which UV light is modulated by LC panel 804, indicated by the dashed arrows. The modulated U.V. light falls on patterned color phosphor layer 806, containing phosphors which emit visible light, indicated by the solid arrows, upon excitation by the U.V. light.

Figure 15:
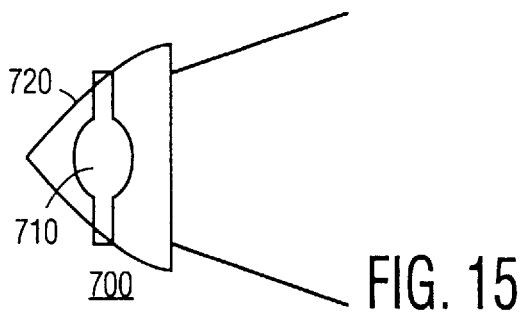
FIG. 15 is an illustration of a conventional HID lamp for area illumination.
Figure 16:
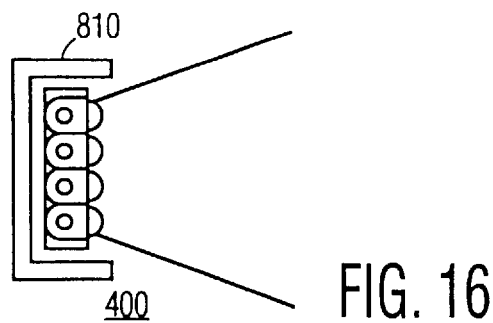
FIG. 16 shows a microlamp array according to the present invention used for area illumination.

Relative to area displays FIG. 15 shows a conventional high intensity discharge light source 700 having an HID lamp 710 within a reflector 720. This light source is used to provide area spot lighting. According to the present invention as seen in FIG. 16, a microlamp array 400 is formed with a holding luminaire structure 810. Such an arrangement according to the present invention provides a higher lumen output of the lamps. Moreover, the microlamp structure of the present invention enables a predetermined illuminated area to be formed by the design of the optical elements.

The above described structures and methodology are merely illustrative of the principles of the present invention. Numerous modifications and adaptations thereof will be readily apparent to those skilled in the art without departing from the spirit and scope of the present invention and the appended claims.

What is claimed is:

1. Flat panel display device comprising an ultra violet light emitting microlamp array, a liquid crystal panel positioned in front of the array for modulating the ultra violet light in accordance with a display signal, and a phosphor layer on the front of the liquid crystal panel for converting the modulated ultra violet light into visible light.

2. The flat panel display device of claim 1 in which the microlamp array comprises fluorescent microlamps.

3. The flat panel display device of claim 1 in which the liquid crystal panel is an active matrix liquid crystal display (AMLCD) panel.

4. The flat panel display device of claim 1 in which the phosphor layer comprises a pattern of color phosphors.

5. A lighting arrangement for liquid crystal displays comprising a liquid crystal panel, and an adjacently disposed illumination system including an array of microlamps, each of said microlamps including a light source cavity, a reflector and a lens.

* * * * *